United States Patent [19]
Lindkvist

[11] Patent Number: 6,038,454
[45] Date of Patent: Mar. 14, 2000

[54] METHOD FOR DENSIFYING A TRANSMITTER AND RECEIVER NETWORK FOR MOBILE TELEPHONY

[75] Inventor: Erik Lindkvist, Stocksund, Sweden

[73] Assignee: Comviq GSM AB, Hägersten, Sweden

[21] Appl. No.: 09/101,998

[22] PCT Filed: Jan. 31, 1996

[86] PCT No.: PCT/SE96/00111

§ 371 Date: Dec. 11, 1998

§ 102(e) Date: Dec. 11, 1998

[87] PCT Pub. No.: WO97/27715

PCT Pub. Date: Jul. 31, 1997

[30] Foreign Application Priority Data

Jan. 23, 1996 [SE] Sweden .................................. 9600245

[51] Int. Cl.[7] .................................................. H04Q 7/20
[52] U.S. Cl. .......................... 455/446; 455/447; 455/449; 455/450
[58] Field of Search .................... 455/446, 447, 455/449, 450, 437, 504, 62

[56] References Cited

U.S. PATENT DOCUMENTS

| | | | |
|---|---|---|---|
| 4,355,411 | 10/1982 | Reudinik et al. | 455/437 |
| 5,247,699 | 9/1993 | Hartman | 455/447 |
| 5,734,983 | 3/1998 | Farouque | 455/446 X |
| 5,901,356 | 5/1999 | Hudson | 455/447 X |

FOREIGN PATENT DOCUMENTS

| | | |
|---|---|---|
| 0470831 | 2/1992 | European Pat. Off. . |
| 0592207 | 4/1994 | European Pat. Off. . |
| WO9502308 | 1/1995 | WIPO . |

*Primary Examiner*—Wellington Chin
*Assistant Examiner*—Yemane Woldetatios
*Attorney, Agent, or Firm*—Alfred J. Mangels

[57] ABSTRACT

A method for densifying a transmitter and a receiver network for mobile telephony. The network includes base stations that each have three cells that are mutually spaced at 120° intervals about the base station. At least four different base stations have mutually different frequency sets in the cells, and base stations of different frequency sets are placed in a repetitive pattern, a so-called 4/12-frequency pattern. A first densification is achieved by causing a center base station that has a first frequency set, and that is located within a generally rhomboidal pattern of base stations, to change its frequency set to the same frequency set as the base stations located at the corners of the rhomboidal pattern. Additional base stations are positioned within the rhomboidal pattern, and the frequency sets of the additional base stations are selected so that the frequency or frequencies of their cells will differ from the frequency or frequencies of the cells of the nearest base station.

7 Claims, 3 Drawing Sheets

METHOD FOR DENSIFYING A TRANSMITTER AND RECEIVER NETWORK FOR MOBILE TELEPHONY

BACKGROUND OF THE INVENTION

1. Field of the Invention

The present invention relates to a method for densifying a transmitter and receiver network for mobile telephony.

Although the present invention can be applied to different types of mobile telephone systems, it will be described in the following with respect to a GSM mobile telephone system.

2. Description of the Related Art

The capacity of a mobile telephone system is restricted by interferences between different transmitter and receiver units. Each transmitter and receiver unit includes an antenna for transmitting and receiving signals to and from a mobile telephone. Communication is effected on different predetermined frequencies, i.e. channels.

Two different types of interference must be taken into account when planning an antenna network, particularly in municipal environments. Interference between two channels on one and the same frequency is one type of interference. In the case of the GSM system, this type of interference means that the carrier signal must be stronger than the interference signal by more than 9 dB. When this criterion is not fulfilled, speech quality is poor and there is a risk of the call being lost, i.e. broken-off.

The other type of interference is caused by the carrier signal being disturbed by a closely adjacent channel. The different permitted channels are numbered in the GSM system. For instance, channel 72 may be disturbed by either channel 71 or 73. In the case of this type of interference, the carrier signal must not be weaker than a closely adjacent channel by more than 9 dB in the GSM system.

When planning a network of antennas operating on different channels, it is necessary to take the aforesaid interferences into account. This applies primarily to municipal environments, in which the antennas are placed relatively close together so as to make achievable a high traffic intensity with regard to the number of simultaneous calls.

There are a number of different accepted models on which a network can be based. The majority of these models include so-called three-sector sites, meaning that a base station is equipped with three directional antennas, normally 60-degree antennas, the directions of which are mutually spaced by 120 degrees. Each antenna is supplied with one or more channels and forms a so-called geographic cell. The antennas belonging to a base station are supplied with different frequencies. The base stations are positioned in accordance with a pattern, in which the cells form an hexagonal configuration. Which channels are transmitted in which antennas is determined by the frequency pattern chosen.

A typical frequency pattern is a 4/12-pattern. In this case, all available frequencies are used once on four base stations including twelve cells. Positioning of the base stations and the cell frequencies are repeated in a repetitive pattern with the cells forming said hexagonal configuration, so that each cell that has one particular frequency will be spaced as far as possible from an adjacent cell that has the same frequency. In other words, this requires at least twelve channels are needed to obtain a 4/12-pattern with one channel per cell. Each cell can be supplied with two channels, provided that twenty-four channels are available.

When capacity is deficient, a denser frequency pattern can be chosen. One such frequency pattern is a 3/9-pattern, meaning that all available frequencies have been used once on three base stations which include nine cells. Thus, in order to increase capacity in comparison with a 4/12-pattern with twenty-four channels, twenty-seven channels are used with each cell being equipped with three channels. There is a great deal of uncertainty with regard to the function of a 3/9-pattern, because of the serious risk that interference problems will occur with subsequent poor speech quality.

A further pattern, namely a 2/12-pattern, has been described. In this pattern, each base station has six sectors and the channels end up in accordance with a given pattern. The 2/12-pattern is highly prone to interference problems.

When needing to increase the capacity of a mobile network, a number of different measures can be taken. The first step in this regard is to add a channel, provided that further channels are available. In the case of a 4/12-pattern, the access to thirty-six channels would mean that three channels can be used with each cell.

Provided that twenty-four channels are used in a 4/12-pattern, capacity can be increased by switching to a 3/9-pattern without needing to build new base stations. A 3/9-pattern, which requires twenty-seven channels, cannot be used to the full when only twenty-four channels are available. However, this means that the frequencies are repeated more frequently, which leads to quality impairment.

Another method employed in this regard involves the use of microcells. Microcells are small base stations of limited range, placed on the walls of buildings for instance, about 5–10 meters above street level. A large number of microcells is able to relieve a superordinate network, i.e. the standard base stations. One drawback with microcells is that they cover only a small area, which results in a variation in signal strength on the part of a user who moves quickly between the cells, since large variations in signal strength occur when turning round street corners. Another drawback resides in the cost of each microcell. The indoor coverage afforded by a microcell is also poor.

The present invention solves the problem of markedly increasing the capacity of the network within a desired geographical area, with a limited number of available channels.

SUMMARY OF THE INVENTION

The present invention thus relates to a method for densifying a transmitter and receiver network for mobile telephony. The network includes base stations which each have three cells whose directions are mutually spaced by 120 degrees, wherein a base station associated with three cells operates on mutually different channels, i.e. frequencies, at least four different base stations have mutually different frequency-sets in the cells, so that each of the cells of the four base stations operates at different frequencies. Base stations are so placed in relation to each other that the cells form an hexagonal pattern, with base stations of different frequency-sets being placed in a repetitive pattern, i.e. a so-called 4/12-frequency pattern. Base stations are placed generally equidistantly from one another along two or more generally parallel and straight lines, wherein each alternate base station in a first line has a given first frequency-set and each other base station has a given second frequency-set. Each alternate base station has a given third frequency-set along a second line and each other base station has a given fourth frequency-set along the second line. By virtue of the hexagonal pattern the base stations along one line are displaced in relation to the base stations on an adjacent line by a distance corresponding generally to half the distance between two base stations lying along one and the same line. A first densification is achieved by causing a center base station that has a first frequency-set and is located in a generally rhomboidal pattern whose corners consist in the four base stations that are located nearest the center base station and have mutually the same frequency-set, i.e. a second frequency-set, to change its frequency-set to the same frequency-set as the base stations located in the corners of said rhomboidal pattern. Further base stations are arranged inwardly of the confines of said rhomboidal pattern. The frequency-sets of respective further base stations are selected so that the frequency or frequencies of their cells will deviate from the frequency or frequencies of the cells of the nearest base stations.

BRIEF DESCRIPTION OF THE DRAWINGS

The invention will now be described in more detail with reference to exemplifying embodiments thereof and also with reference to the accompanying drawings, in which.

DESCRIPTION OF THE PREFERRED EMBODIMENTS

Figure 1:
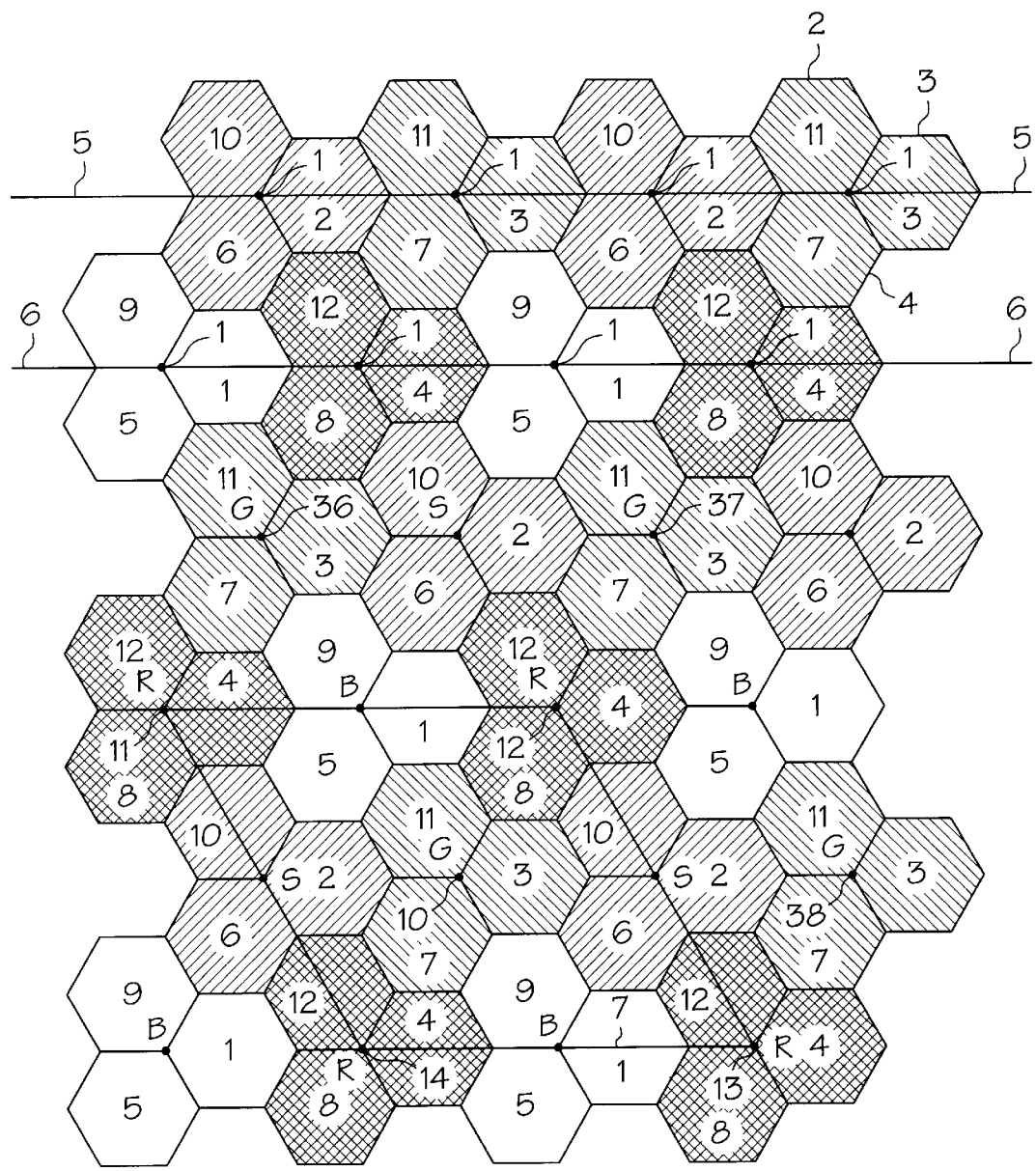
FIG. 1 illustrates a cell structure according to a 4/12-pattern.

FIG. 1 illustrates a conventional 4/12-pattern of the aforesaid kind. The reference numeral 1 identifies a base station, each of which is surrounded by three hexagonal cells 2, 3, 4. The cells thus form the aforesaid hexagonal pattern. The numerals 1 to 12 shown in the centers of the different cells refer to the channel group, or frequency-set, transmitted in respective cells. Each channel group may consist of one frequency or of two or more frequencies, depending on the number of frequencies available to the net operator.

The present invention relates to such a network for mobile telephony. The network is thus comprised of a large number of base stations 1, each having three cells 2, 3, 4, the directions of which are mutually spaced by 120 degrees. The three cells of a base station operate on mutually different channels, i.e. frequencies. The network includes at least four different base stations with cells that have mutually different frequency-sets in the cells, so that each of the cells of the four base stations will operate on a frequency that is different from that of the others. The base stations 1 are positioned relative to one another such that the cells 2, 3, 4 in the network form an hexagonal pattern, with base stations having different frequency-sets being placed in a repetitive pattern, i.e. a so-called 4/12-frequency pattern.

The base stations are placed generally equidistantly from one another along two or more generally parallel and straight lines. Such lines are referenced 5 and 6 in FIG. 1. Each alternate base station along the first line 5 has a given first frequency-set and each other base station along that line has a given second frequency-set. Each alternate base station along the second line 6 has a given third frequency-set and each other base station along that line has a given fourth frequency-set. As a result of the hexagonal pattern, the base stations that lie on a first line 5 are displaced in the longitudinal direction of the line in relation to the base stations on an adjacent second line 6 by a distance which corresponds essentially to half the distance between two base stations that lie on one and the same line.

It has been said in the aforegoing that the base stations are spaced generally equidistant from one another along two or more essentially parallel and straight lines. It has also been said that the mutual displacement of base stations along adjacent lines corresponds essentially to half the distance between two base stations that are located on one and the same line. FIG. 1 illustrates an ideal 4/12-pattern. In practice, a base station consists of a mast which carries antennas. It will be understood that it can be difficult, or quite impossible, particularly in densely built-up areas, to erect the base stations in an ideal pattern, due to inaccessibility to buildings and the lack of ground on which to place the base stations. The positions of the base stations in a virtual network will therefore differ more or less from the ideal positions shown in FIG. 1.

According to the invention, a first densification of the network is achieved by causing a center base station 10 having a first frequency-set G and located in a generally rhomboidal pattern 7 whose corners are defined by the four base stations 11–14 that are located nearest the center base station and that have mutually the same second frequency-set R, to change its frequency-set G to the same frequency-set R as that of the base stations 11–14 at the corners of said rhomboidal pattern.

The four different frequency sets of the base stations are referenced G, R, B and S in FIG. 1. In addition to base stations having the frequency-set R and located in the corners of the rhomboidal pattern, base stations 23–26 (see FIG. 2) are also found on respective pairs of opposite sides of the rhomboid. These have the frequency-sets S and B, respectively.

Naturally, each rhomboid in the 4/12-pattern formed by base stations that have mutually the same frequency-set can be chosen to densify the network within the rhomboid.

Figure 2:
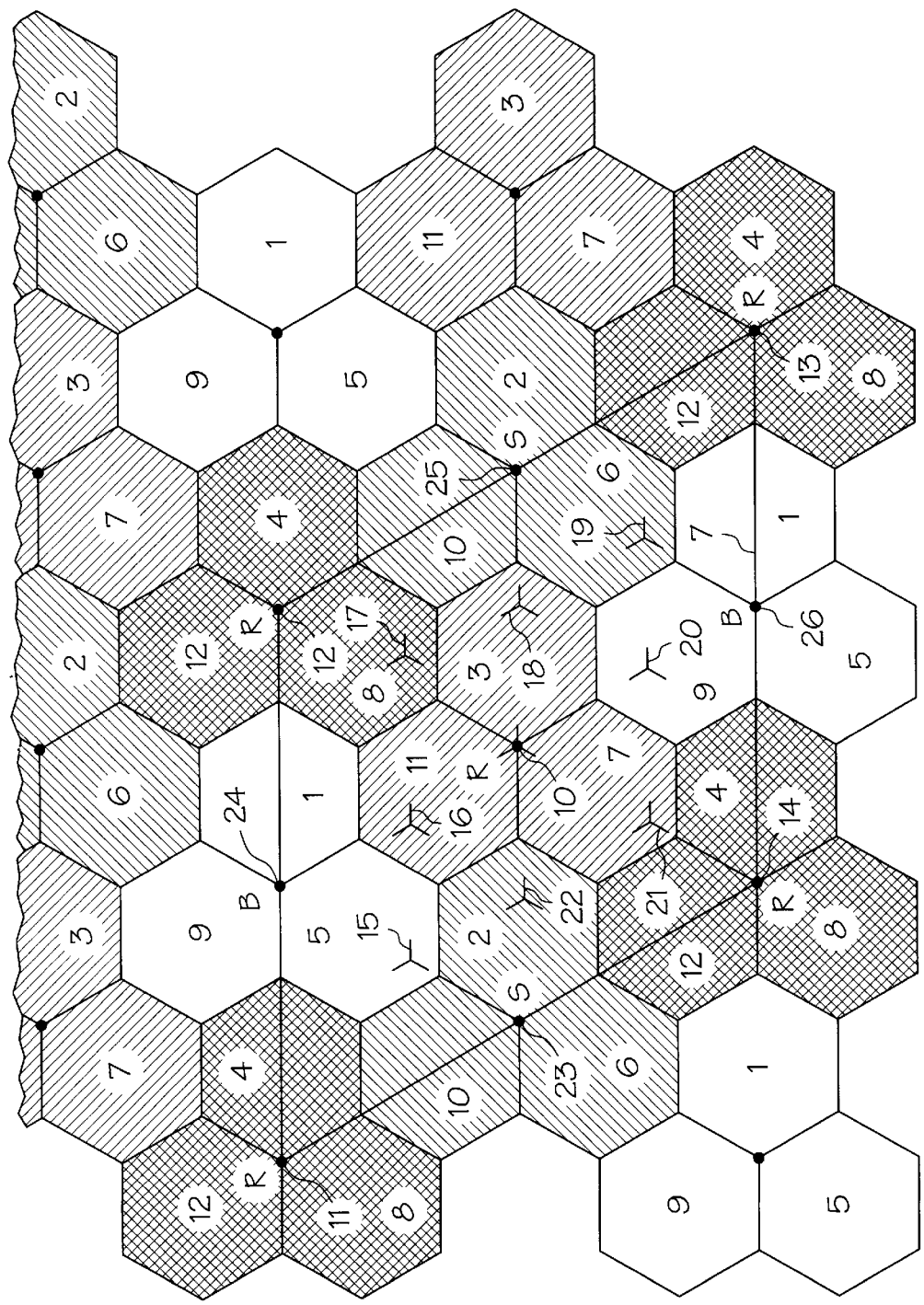
FIG. 2 illustrates part of the cell structure in FIG. 1 in larger scale, in which densification is effected in a first stage in accordance with the invention.

According to the invention, further base stations 15–22 are arranged within the rhomboid 7 as shown in FIG. 2, which shows the rhomboid of FIG. 1 in larger scale. The frequency-sets G, R, B and S of respective further base stations 15–22 are selected so that the frequency or frequencies of their different cells will differ from the frequency or frequencies of the cells of the base stations nearest thereto.

It has surprisingly been found that a 4/12-network can be densified in this way without incurring the interference problems mentioned in the introduction. By changing the frequency-set of the center base station 10 to the frequency-set of the base stations located in respective corners of the rhomboid, it is possible to choose the frequency-sets for the further base stations which differ from the frequency-set of the center base station 10 and the corner base stations 11–14 and which differ from the nearest base stations 15–26, including the additional base stations 15–22.

In speech communication, the cell of each base station will cover a geographic area which is smaller than the area covered by each original cell, within which area the base station concerned will be the strongest base station and dominate over the cells of surrounding lying base stations.

Thus, as a result of this densification, a larger number of base stations, and therewith cells, will be available for communication within the densified area.

The mutual positions of the further base stations and their positions in relation to the original base stations is not absolutely critical, and can be varied. The number of further base stations can also be varied.

According to another preferred embodiment of the invention, however, the further base stations 15–22 are eight in number. The further base stations 15–22 are arranged within the rhomboid 7 in a rhomboidal pattern which is concentric with the rhomboid 7 and which has a side length which is essentially half of the side length of the larger rhomboid. Thus, in FIG. 2, the base stations 15, 17, 19 and 21 define the concentric smaller rhomboid.

According to this embodiment, the frequency-set of respective further base stations 15–22 in the concentrical rhomboidal pattern is the same as the frequency-sets in a rhomboid formed by the original base stations, this rhomboid being displaced from and with its sides parallel with the first-mentioned rhomboid 7 and having a center base station which has said second frequency-set, namely the frequency-set R that the center base station has. Such a rhomboid is formed, for instance, by the original base stations 10, and 36–38 as seen in FIG. 1. All of these base stations have originally the frequency-set G.

In the case of this embodiment, the smaller rhomboid is oriented so that the additional base stations 15, 17, 19 and 21 in the corners of the smaller rhomboid have the first frequency-set, i.e. the frequency-set G that the base station 10 had originally.

A typical distance between the original base stations is about 1,000 meter. As a result of the aforedescribed densification, the distance between the base stations in the densified area will be about 500 meter.

Figure 3:
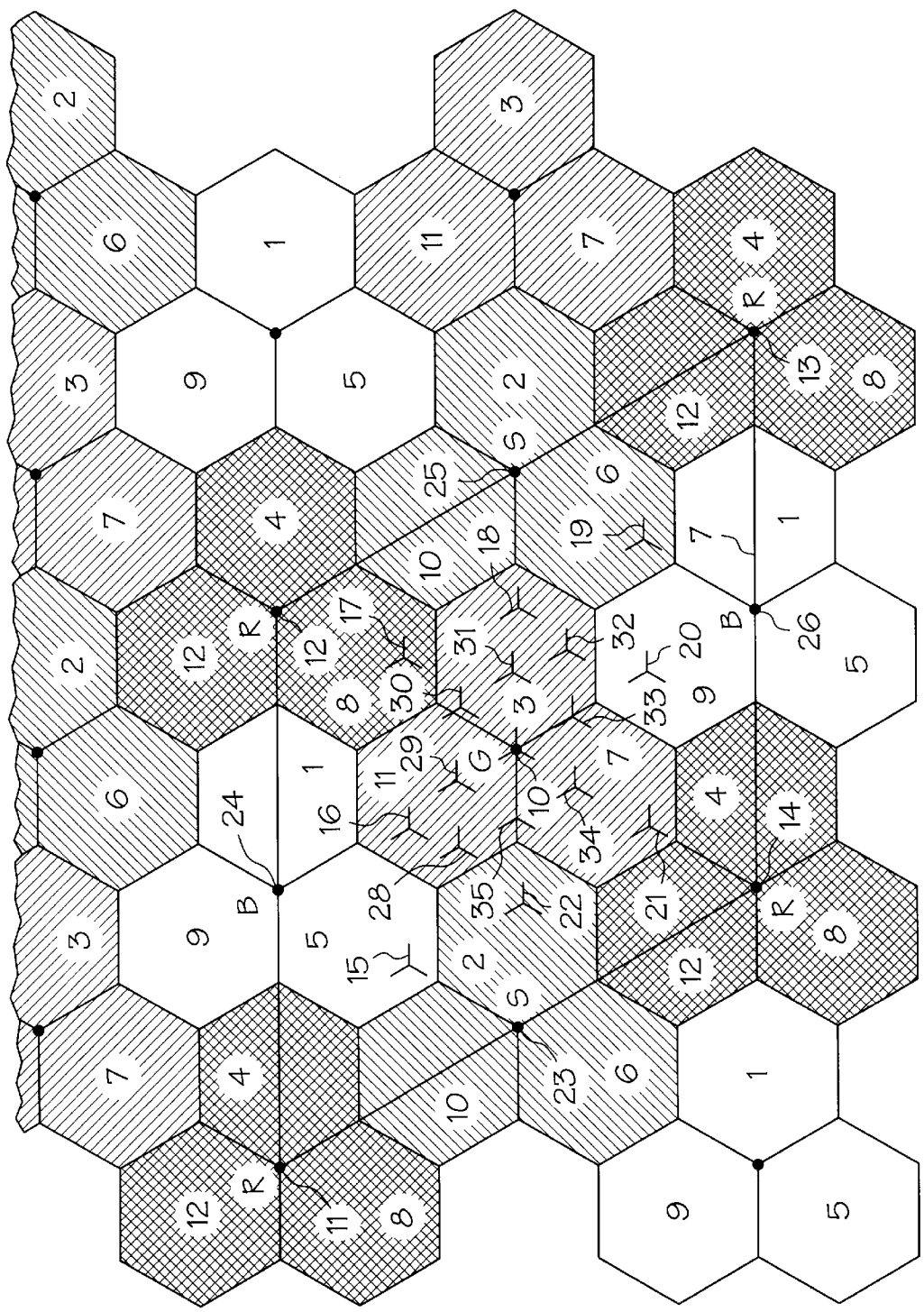
FIG. 3 illustrates part of the cell structure in FIG. 1 in larger scale, in which densification is effected in a first and a second stage in accordance with the invention.

FIG. 3 further illustrates a highly preferred embodiment of the invention in which the network is further condensed or densified. FIG. 3 illustrates the region concerned in FIG. 2. This further densification around the first-mentioned center base station 10 is achieved by causing the base station to revert back to its original first frequency-set G. In addition, eight additional base stations 28–35 are arranged inwardly of the aforesaid smaller rhomboid, i.e. the rhomboid defined by the base stations 15, 17, 19 and 21. This further densification of the network is achieved in accordance with the same principles as those applied with the first densification.

The further densification is thus achieved in a rhomboidal pattern which is concentric with the smaller rhomboid and which thus becomes the smallest rhomboid. The smallest concentric rhomboid has a side length which is essentially half the side length of said smaller rhomboid.

The frequency-set of respective additional base stations placed in the smallest concentrical rhomboidal pattern is the same as the frequency-sets in a rhomboid containing the original base stations, this rhomboid being displaced parallel with, or coinciding with, the first mentioned rhomboid 7 and having a center base station with the first frequency-set G.

The smallest rhomboid is orientated so that the additional base stations 28, 30, 32 and 34 in the corners of the smallest rhomboid have said second frequency-set R.

It has surprisingly been found that this high degree of densification also avoids the interference problems mentioned in the introduction, despite the fact that the distance between the additional base stations 15–21 and 28–35 in the aforedescribed example is as short as about 250 meters. According to one preferred embodiment of the invention, the center base station and the additional base stations grouped around the center base station have a transmission power which is essentially the same as the transmission power of remaining base stations. This means that interferences between two mutually adjacent base stations that have the same frequency-set will be effectively avoided because each cell is strong within its own area. The network will also provide highly effective indoor coverage in built-up municipal areas.

According to one preferred embodiment of the invention, densification in an area outside and adjacent to the first-mentioned rhomboid 7, extending between the original base stations 11–14, is achieved in the same way as that described above inwardly of a rhomboid of the same size as and bordering on the first-mentioned rhomboid. Naturally, the network in any area whatsoever located outside the first-mentioned rhomboid can be made denser in the aforesaid manner.

It has been said in the aforegoing that the relative positions of the base stations with regard to each other and with regard to the original base stations can be varied and that the number of additional base stations can also be varied.

However, the aforedescribed preferred embodiments are very important, since a first densification of the network and also a second densification of the network in accordance with the aforegoing provides a highly dense network in which interference problems are avoided.

According to one preferred embodiment of the invention, one or more of the center base station and the further base stations grouped therearound, and also other base stations are caused to transmit and receive signals on tilted antennas where the lobe points obliquely downwards, so as to limit the range of the respective antennas.

This embodiment can be applied when disturbances would otherwise occur, for instance due to two cells being too close together because the antennas cannot be positioned in any other way. For instance, it may be difficult to choose optimal positions for the base stations in a densely built-up area.

The embodiment can also be used in those instances when one or two of the additional base stations cannot be placed anywhere at all, for instance due to the presence of waterways in municipal built-up areas.

The densification of an existing network according to a 4/12-pattern has been described in the aforegoing. It will be obvious, however, that the inventive method can be applied equally as well to densify conventional 4/12-patterns when building a completely new network.

Although the invention has been described above with reference to a number of exemplifying embodiments thereof, it will be understood that modifications can be made with respect to the transmission strength of individual base stations or cells, and with regard to their positions, as imposed by practical circumstances.

The invention shall not therefore be considered limited to the aforedescribed and illustrated embodiments thereof, since variations and modifications can be made within the scope of the following Claims.

What is claimed is:

1. A method for densifying a transmitter and receiver network for mobile telephony, said method comprising the steps of: providing a network of base stations which each have three cells whose directions are mutually spaced by 120 degrees, wherein the three cells associated with a given base station operate on mutually different frequencies and wherein the network includes at least four different base stations that have mutually different frequency-sets in the respective cells, so that the cells associated with the at least four base stations each operate at different frequencies; positioning the base stations in relation to each other so that the cells form an hexagonal pattern with base stations of different frequency-sets being placed in a repetitive pattern generally equidistantly from one another along at least two spaced, generally parallel and straight lines, wherein each alternate base station in a first line has a given first frequency-set and each intervening base station in the first line has a given second frequency-set, wherein each alternate base station in a second line has a given third frequency-set and each intervening base station in the second line has a given fourth frequency-set so that by virtue of the hexagonal pattern of the cells the base stations along one line are displaced in relation to the base stations on an adjacent line by a distance corresponding generally to half the distance between two base stations lying along one and the distance between two base stations lying along one and the same line and so that two consecutive base stations in the first line and two adjacent consecutive base stations in the second line define corners of a generally rhomboidal outer pattern, and a center base station within the generally rhomboidal pattern and having a first frequency-set and wherein the corner base stations each have the same second frequency-set; changing the frequency-set of the center base station to the same frequency-set as that of the corner base stations; providing additional base stations inwardly of the generally rhomboidal pattern; and selecting the frequency-sets of the additional base stations so that the frequencies of their cells differ from the frequencies of the cells of the nearest base stations.

2. A method according to claim 1, wherein the additional base stations include eight additional base stations arranged in a generally rhomboidal inner pattern which is within and concentric with the generally rhomboidal outer pattern such that the generally rhomboidal inner pattern has a side length which is half of a side length of the generally rhomboidal outer pattern; and the step of placing the additional base stations within the generally rhomboidal inner pattern pattern so that they have a respective frequency-set which is the same as the frequency-sets in a generally rhomboidal pattern that is displaced from and parallel with the generally rhomboidal outer pattern and having a center base station with the second frequency-set, wherein the additional base stations at the corners of the generally rhomboidal inner pattern have the first frequency-set.

3. A method according to claim 2, including the steps of causing the center base station to switch its frequency-set back to the first frequency-set; and providing eight additional base stations within the generally rhomboidal inner pattern in a rhomboidal pattern which is concentric with the generally rhomboidal inner pattern to define an innermost generally rhomboidal pattern that has a side length which is half the side length of the generally rhomboidal inner pattern, wherein the eight additional base stations defining the innermost generally rhomboidal pattern have a respective frequency-set which is the same as the frequency-sets in a generally rhomboidal pattern that is displaced from and parallel with the generally rhomboidal outer pattern or coinciding with the generally rhomboidal outer pattern and that has a center base station with the first frequency-set, wherein the eight additional base stations that define corners of the innermost generally rhomboidal pattern have the second frequency-set.

4. A method according to claim 1, wherein the center base station and the base stations grouped therearound have a transmission power which is essentially the same as the transmission power of other base stations in the network.

5. A method according to claim 1, wherein the base stations transmit and receive signals with tilted antennas wherein an antenna lobe points obliquely downward to limit the range of the respective antennas.

6. A method according to claim 1, wherein the distance between base stations is about 1,000 meters; and wherein the shortest distance between two base stations subsequent to densifying the network is about 250 meters.

7. A method according to claim 1, including the step of densifying an area outwardly of and bordering on the generally rhomboidal outer pattern and extending between the base stations defining the generally rhomboidal outer pattern and positioned inwardly of a generally rhomboidal pattern of the same size and adjoining the generally rhomboidal outer pattern.

* * * * *